United States Patent
Yang

(10) Patent No.: US 10,241,687 B2
(45) Date of Patent: Mar. 26, 2019

(54) METHOD FOR OPERATING SEMICONDUCTOR DEVICE AND SEMICONDUCTOR SYSTEM

(71) Applicant: Seung-Soo Yang, Hwaseong-si (KR)

(72) Inventor: Seung-Soo Yang, Hwaseong-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 0 days.

(21) Appl. No.: 15/042,887

(22) Filed: Feb. 12, 2016

(65) Prior Publication Data

US 2016/0306567 A1 Oct. 20, 2016

(30) Foreign Application Priority Data

Apr. 14, 2015 (KR) .................. 10-2015-0052281

(51) Int. Cl.
*G06F 3/06* (2006.01)
*G06F 12/06* (2006.01)
*G06F 12/02* (2006.01)

(52) U.S. Cl.
CPC .......... *G06F 3/0613* (2013.01); *G06F 3/0653* (2013.01); *G06F 3/0685* (2013.01); *G06F 12/023* (2013.01); *G06F 12/0607* (2013.01); *G06F 2212/1044* (2013.01); *Y02D 10/13* (2018.01)

(58) Field of Classification Search
CPC .... G06F 3/0613; G06F 3/0685; G06F 12/023; G06F 3/0653; G06F 12/0607; G06F 2212/1044
See application file for complete search history.

(56) References Cited

U.S. PATENT DOCUMENTS

| | | |
|---|---|---|
| 5,559,953 A | 9/1996 | Seiler et al. |
| 6,405,286 B2 | 6/2002 | Gupta et al. |
| 7,213,084 B2 | 5/2007 | Ogilvie et al. |
| 7,213,099 B2 | 5/2007 | Kuo et al. |
| 7,233,335 B2 | 6/2007 | Moreton et al. |
| 7,237,123 B2 | 6/2007 | LeVine et al. |
| 7,317,957 B1 | 1/2008 | Embree et al. |
| 7,346,750 B2 | 3/2008 | Ishikawa |
| 7,426,622 B2 | 9/2008 | Yoder |
| 7,480,776 B2 | 1/2009 | Sohn et al. |

(Continued)

FOREIGN PATENT DOCUMENTS

| | | |
|---|---|---|
| EP | 01517243 A2 | 3/2005 |
| EP | 02216722 A2 | 8/2010 |

(Continued)

*Primary Examiner* — Tuan V Thai
*Assistant Examiner* — Tasnima Matin
(74) *Attorney, Agent, or Firm* — Harness, Dickey & Pierce, P.L.C.

(57) ABSTRACT

A method for operating a semiconductor device includes receiving a memory request for a memory; calculating a memory bandwidth such that the memory bandwidth is at least large enough to support allocation of the memory in accordance with the memory request; creating a memory path for accessing the memory using a memory hierarchical structure wherein a memory region that corresponds to the memory path is a memory region that is allocated to support the memory bandwidth; and performing memory interleaving with respect to the memory region that corresponds to the memory path.

18 Claims, 13 Drawing Sheets

(56) References Cited

U.S. PATENT DOCUMENTS

| | | | |
|---|---|---|---|
| 7,480,781 | B2 | 1/2009 | Natarajan et al. |
| 7,483,817 | B2 | 1/2009 | Mishuku |
| 7,484,065 | B2 | 1/2009 | Pomaranski et al. |
| 7,490,217 | B2 | 2/2009 | Tremaine |
| 7,539,842 | B2 | 5/2009 | Tremaine |
| 7,782,982 | B2 | 8/2010 | Yousef |
| 7,865,796 | B2 | 1/2011 | Irving |
| 7,872,657 | B1 * | 1/2011 | Edmondson ........ G06F 12/0607 345/540 |
| 8,095,725 | B2 | 1/2012 | Kardach et al. |
| 8,190,848 | B2 | 5/2012 | Thyagarajan |
| 8,375,173 | B2 | 2/2013 | Wang et al. |
| 8,464,009 | B2 | 6/2013 | Sivaramakrishnan et al. |
| 8,607,126 | B1 | 12/2013 | Tzannes et al. |
| 2006/0092934 | A1 * | 5/2006 | Chung ................ H04L 47/2441 370/389 |
| 2008/0320254 | A1 | 12/2008 | Wingard et al. |
| 2008/0320255 | A1 | 12/2008 | Wingard et al. |
| 2010/0191997 | A1 | 7/2010 | Dodeja et al. |
| 2010/0318760 | A1 | 12/2010 | So et al. |
| 2011/0213949 | A1 | 9/2011 | Jayasimha et al. |
| 2011/0276727 | A1 * | 11/2011 | Arntzen ................ G06F 13/161 710/35 |
| 2011/0320751 | A1 | 12/2011 | Wang et al. |
| 2012/0054423 | A1 | 3/2012 | Wang et al. |
| 2012/0054455 | A1 | 3/2012 | Wang et al. |
| 2012/0137090 | A1 | 5/2012 | Biswas et al. |
| 2012/0179883 | A1 | 7/2012 | Ma |
| 2013/0132662 | A1 | 5/2013 | Muroyama et al. |
| 2013/0246734 | A1 | 9/2013 | Schaefer et al. |
| 2013/0246893 | A1 | 9/2013 | Schoppmeier |
| 2014/0115248 | A1 | 4/2014 | Kardach et al. |
| 2014/0164720 | A1 | 6/2014 | Stewart et al. |

FOREIGN PATENT DOCUMENTS

| | | |
|---|---|---|
| EP | 02568637 A1 | 3/2013 |
| JP | H04293135 A | 10/1992 |
| JP | H0844624 A | 2/1996 |
| JP | 2005-092374 A | 4/2005 |
| KR | 2009-0011573 A | 2/2009 |
| WO | WO-94008295 A1 | 4/1994 |
| WO | WO-08106562 A2 | 9/2008 |

* cited by examiner

1200

1300

1400

METHOD FOR OPERATING SEMICONDUCTOR DEVICE AND SEMICONDUCTOR SYSTEM

CROSS-REFERENCE TO RELATED APPLICATIONS

This application is based on and claims priority from Korean Patent Application No. 10-2015-0052281, filed on Apr. 14, 2015 in the Korean Intellectual Property Office, the disclosure of which is incorporated herein in its entirety by reference.

BACKGROUND

1. Field

At least some example embodiments of the inventive concepts relate to a method for operating a semiconductor device and a semiconductor system.

2. Description of the Prior Art

In order to extend a memory bandwidth, an interleaving technique, in which adjacent memories are put in different channels, ranks, or banks, and the memories existing in the different channels, ranks, or banks can be simultaneously accessed, may be used. However, in a memory interleaving system using a plurality of memory modules, a memory access speed may be increased, but power consumption may also be increased. Accordingly, it is required to efficiently improve the memory interleaving technique in accordance with detailed memory accessing conditions.

SUMMARY

An object of at least one example embodiment of the inventive concepts is to provide a method for operating a semiconductor device, which makes it possible to flexibly use a memory bandwidth in accordance with a memory accessing scenario in the semiconductor device using a memory interleaving technique.

An object of at least one example embodiment of the inventive concepts is to provide a memory system, which makes it possible to flexibly use a memory bandwidth in accordance with a memory accessing scenario in the semiconductor system using a memory interleaving technique.

Additional advantages, objects, and features of at least some example embodiments of the inventive concepts will be set forth in part in the description. which follows and in part will become apparent to those having ordinary skill in the art upon examination of the following or may be learned from practice of at least some example embodiments of the inventive concepts.

According to at least some example embodiments of the inventive concepts, a method for operating a semiconductor device includes receiving a memory request for a memory; calculating a memory bandwidth such that the memory bandwidth is at least large enough to support allocation of the memory in accordance with the memory request; creating a memory path for accessing the memory using a memory hierarchical structure wherein a memory region that corresponds to the memory path is a memory region that is allocated to support the memory bandwidth; and performing memory interleaving with respect to the memory region that corresponds to the memory path.

The calculating the memory bandwidth may include calculating the memory bandwidth using at least one of parameter information used for the memory request, bandwidth information of another device that has made the memory request, bandwidth information determined in accordance with an operation scenario of the semiconductor device, and bandwidth information determined in a process or a thread to make the memory request.

The memory may include a plurality of sub-arrays including memory cells, a plurality of banks each including the plurality of sub-arrays, a plurality of ranks each including the plurality of banks, and a plurality of channels including the plurality of ranks, and the sub-arrays, the banks, the ranks, and the channels form the memory hierarchical structure.

Physical addresses of the memory region that corresponds to the memory path may be mapped on a virtual address space, and the performing the memory interleaving may include performing the memory interleaving with respect to the physical addresses.

The performing the memory interleaving may include operating the memory region that corresponds to the memory path in a normal power mode; and operating a memory region of the memory that does not correspond to the memory path in a low power mode, the low power mode being a mode that uses less power than the normal power mode.

According to at least some example embodiments of the inventive concepts, a method for operating a semiconductor device includes receiving a memory request for a memory; calculating a memory bandwidth such that the memory bandwidth is at least large enough to support allocation of the memory in accordance with the memory request; selecting ranks and channels that support the memory bandwidth among a plurality of ranks of the memory and a plurality of channels including the plurality of ranks; and performing memory interleaving with respect to the selected ranks and channels.

The selecting the ranks and channels that support the memory bandwidth may include selecting the ranks and channels that support the memory bandwidth on the basis of latency information of the memory.

The method may further include mapping physical addresses of the memory region that corresponds to the selected ranks and channels on a virtual address space, and the performing the memory interleaving with respect to the selected ranks and channels may include performing the memory interleaving with respect to the physical address space.

The performing the memory interleaving with respect to the selected ranks and channels may include operating the memory region that corresponds to non-selected ranks and channels among the plurality of ranks and the plurality of channels of the memory in a low power mode, the low power mode being a mode that uses less power than a power mode in which a memory region that corresponds to the selected ranks and channels among the plurality of ranks and the plurality of channels is operated.

The selecting the ranks and channels may include selecting sub-arrays, banks, ranks, and channels that support the memory bandwidth among a plurality of sub-arrays, a plurality of banks each including the plurality of sub-arrays, a plurality of ranks each including the plurality of banks, and a plurality of channels including the plurality of ranks.

According to at least some example embodiments, a method for operating a semiconductor device includes receiving a memory request for a memory; calculating a memory bandwidth such that the memory bandwidth is at least large enough to support allocation of the memory in accordance with the memory request; designating a first region of the memory as a busy region wherein the busy region includes at least enough memory resources to support the memory bandwidth; designating a second region of the memory as an idle region; and performing memory interleaving with respect to the busy region.

Physical addresses of the first region of the memory region may be mapped on a virtual address space, and the performing the memory interleaving may include performing the memory interleaving with respect to the physical addresses.

The performing the memory interleaving may include operating the idle region in a low power mode while performing the memory interleaving with respect to the busy region, the low power mode being a mode that uses less power than a power mode in which the busy region is operated.

The performing the memory interleaving may include operating the idle region in a self-refresh mode while performing the memory interleaving with respect to the busy region.

The memory resources may include sub-arrays, banks including the sub-array, ranks including the banks, and channels including the ranks.

The busy region may include a minimum amount of the memory resources necessary to support the memory bandwidth.

According to at least some example embodiments of the inventive concepts, a method of operating a semiconductor memory device including a plurality of memory groups includes receiving a memory request for accessing memory of the semiconductor memory device; determining, based on the memory request, a first data rate; allocating a first portion of the plurality of memory groups such that, the first portion includes one or more of the plurality of memory groups and excludes one or more of the plurality of memory groups, and a number of groups in the first portion of the plurality of memory groups is based on the first data rate; and executing the memory request by performing memory interleaving on the first portion of the plurality of memory groups and not on a second portion of the plurality of memory groups, the second portion being the one or more memory groups excluded from the first portion.

The memory of the semiconductor memory device may include a plurality of memory modules, the plurality of memory modules may each include a plurality of memory banks, and the plurality of memory groups may be the plurality of memory modules.

The memory of the semiconductor memory device may include a plurality of memory banks, and the plurality of memory groups may be the plurality of memory banks.

The memory of the semiconductor memory device may include a plurality of memory ranks, the plurality of memory ranks may each include a plurality of memory banks, and the plurality of memory groups may be the plurality of memory ranks.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION OF TILE EMBODIMENTS

Figure 1:
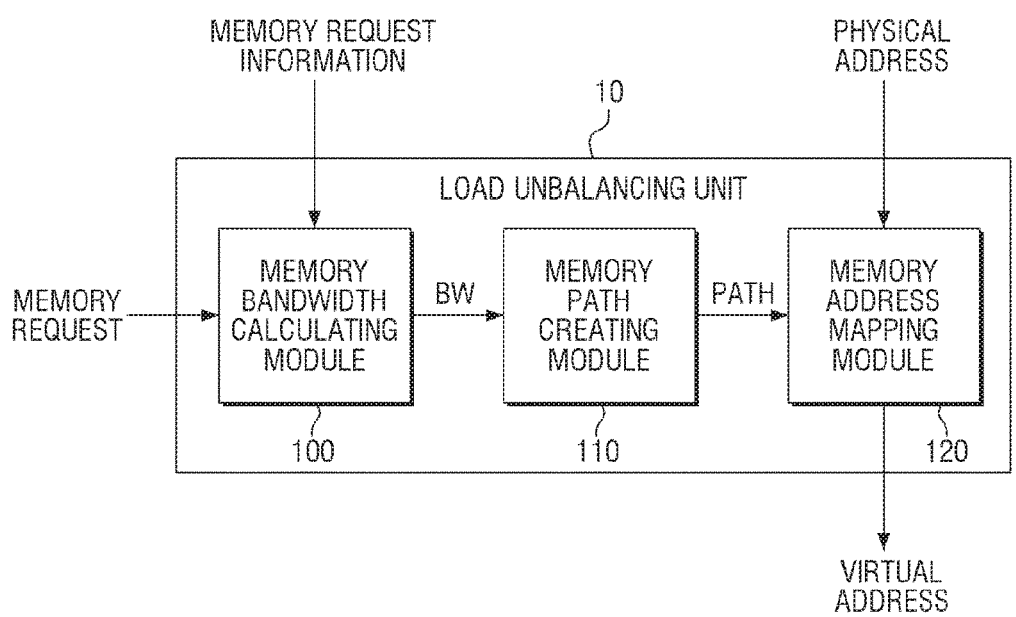
FIG. 1 is a schematic diagram explaining a load unbalancing unit according to at least one example embodiment of the inventive concepts.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

FIG. 1 is a schematic diagram explaining a load unbalancing unit according to at least one example embodiment of the inventive concepts.

Referring to FIG. 1, a load unbalancing unit 10 according to at least one example embodiment of the inventive concepts includes a memory bandwidth calculating module 100, a memory path creating module 110, and a memory address mapping module 120.

According to at least one example embodiment of the inventive concepts, the load unbalancing unit 10 may include or be implemented by one or more circuits or circuitry (e.g., hardware) specifically structured to carry out some or all of the operations described herein as being performed by the Load unbalancing unit 10 (or an element thereof). According to at least one example embodiment of the inventive concepts, the load unbalancing unit 10 may include or be implemented by a memory and one or more processors executing computer-readable code (e.g., software) that is stored in the memory and includes instructions corresponding to some or all of the operations described herein as being performed by the load unbalancing unit 10 (or an element thereof). According to at least one example embodiment of the inventive concepts, the load unbalancing unit 10 may be implemented by, for example, a combination of the above-referenced hardware and processors executing computer-readable code.

The term 'processor', as used herein, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multiprocessor, an application-specific integrated circuit (ASIC), and a field programmable gate array (FPGA). Processors executing program code are programmed processors, and thus, are special-purpose computers.

The memory bandwidth calculating module 100 receives a memory request for a memory, and calculates a memory bandwidth that is required to allocate the memory in accordance with the received memory request. Here, the memory bandwidth means an amount of per unit time (i.e., a data rate) that is required for a specific application or a specific device that uses the memory to transmit and receive data with the memory. According to at least some example embodiments, the memory bandwidth may refer to a data rate per unit required to transmit a requested amount of data within a reference amount of time.

The specific application or the specific device that uses the memory may make the memory request and provide memory request information related to the memory request at the same time. The memory bandwidth calculating module 100 may calculate the memory bandwidth using the memory request information.

On the other hand, in at least some example embodiments of the inventive concepts, the memory bandwidth may be calculated when at least one trigger condition is satisfied. Here, the trigger condition may include, for example, a case where there is a function call for a memory allocator, a case where an application is executed, a case where a thread or a process is created or executed, and a case where a memory fault occurs. That is, the memory bandwidth calculating module 100 may calculate the memory bandwidth on the basis of memory request information that is accompanied by the function call for a memory allocator, memory request information that is accompanied when an application is executed, memory request information that is accompanied when a thread or a process is created or executed, and memory request information that is accompanied when a memory fault occurs.

As an example, the memory bandwidth calculating module 100 may calculate the memory bandwidth using parameter information used for the memory request. Here, the parameter memory that is used for the memory request may include a parameter value for designating the size of the requested memory in the function call for a memory allocator. The memory bandwidth calculating module 100 may calculate the memory bandwidth from the parameter value that designates the size of the requested memory.

Figure 2:
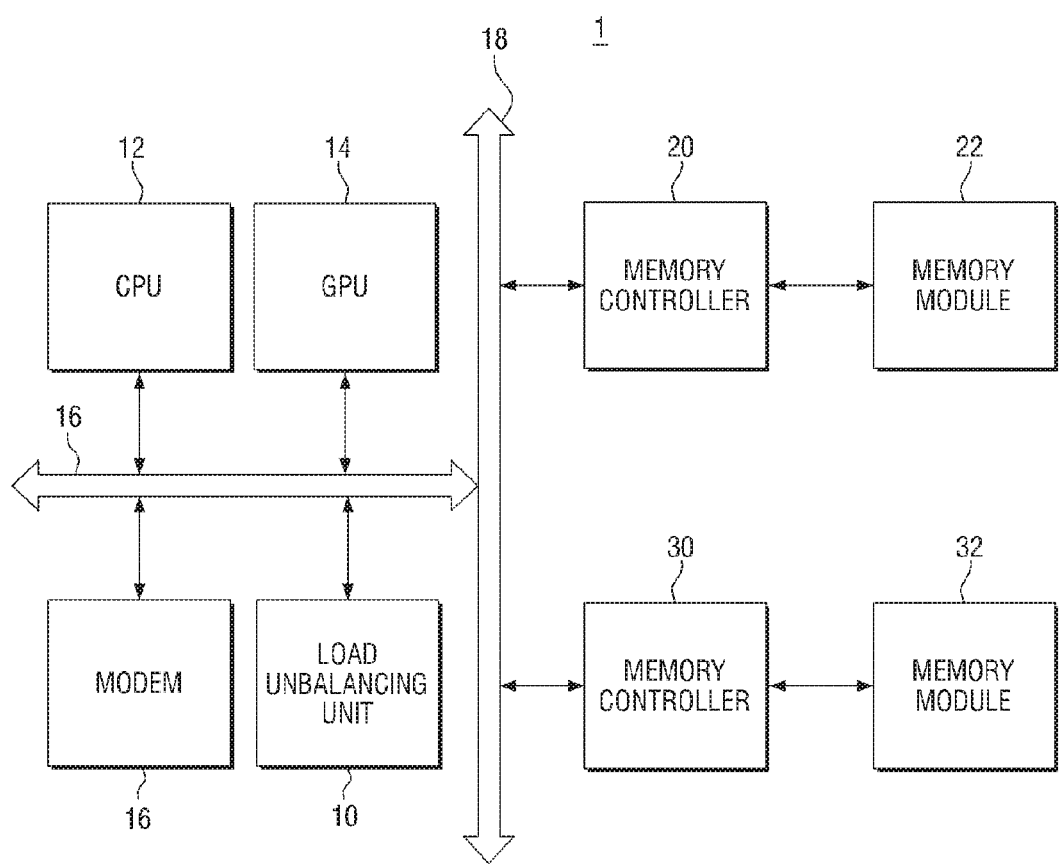
FIG. 2 is a schematic diagram explaining a semiconductor system according to at least one example embodiment of the inventive concepts.

As another example, the memory bandwidth calculating module 100 may calculate the memory bandwidth using bandwidth information of another device that has made the memory request. Here, the other device that has made the memory request may be a device, which is electrically connected to the load unbalancing unit 10 and accesses the memory through the load unbalancing unit 10. An example of such a device is a modem 16 as illustrated in FIG. 2, however at least some example embodiments are not limited to the modem 16 illustrated in FIG. 2. For example, in the case where the modem 16 as illustrated in FIG. 2 makes a memory request, the memory bandwidth calculating module 100 of the load unbalancing unit 10 may calculate the memory bandwidth using the data rate in accordance with a data transmission protocol of the modem 16.

As still another example, the memory bandwidth calculating module 100 may calculate the memory bandwidth using bandwidth information determined in accordance with an operation scenario of a semiconductor device (e.g., a semiconductor device that includes, or is connected to, the load unbalancing unit 10). According to at least some example embodiments of the inventive concepts, the bandwidth information may be predetermined (e.g. determined prior to the performance of the calculation of the memory bandwidth by the bandwidth calculating module). According to at least some example embodiments of the inventive concepts, the term operation scenario may refer to a kind of operation mode that is determined to control the operation of the semiconductor device in accordance with a use environment of the semiconductor device that includes the load unbalancing unit 10. According to at least some example embodiments of the inventive concepts, one or more operations modes may be predetermined (e.g. determined prior to the performance of the calculation of the memory bandwidth by the bandwidth calculating module) to control the operations of the semiconductor device with respect to one or more use environments, respectively. Examples of the above-referenced operation scenario include, but are not limited to, a scenario to reproduce media data while turning off a display, a scenario to turn on only a cellular communication function and to turn off other remaining functions, and a scenario to operate in a low power mode so as to save a battery. The memory bandwidth calculating module 100 may calculate the memory bandwidth using the bandwidth information determined or, alternatively, predetermined in accordance with the operation scenario.

In at least some example embodiments of the inventive concepts, the operation scenario may be changed during the operation of the semiconductor device. For example, according to at least some example embodiments, in the case where the operation scenario of the semiconductor device is changed from a first operation scenario to a second operation scenario, the memory bandwidth previously calculated by the memory bandwidth calculating module 100 in accordance with the first operation scenario may be recalculated in accordance with the second operation scenario.

As still another example, the memory bandwidth calculating module 100 may calculate the memory bandwidth using the bandwidth information determined or, alternatively, predetermined in a process or a thread that makes a memory request. Here, the bandwidth information determined or, alternatively, predetermined in the process or the thread that makes the memory request includes, for example, data rate information in accordance with the data input/output operation of the process or the thread that is executed on a CPU 12 as illustrated in FIG. 2. The memory bandwidth calculating module 100 may calculate the memory bandwidth from the data rate information that is determined from the process or the thread.

Up to now, examples of the memory request information that the memory bandwidth calculating module 100 uses to calculate the memory bandwidth have been described, but the scope of at least one example embodiment of the inventive concepts is not limited to the above-referenced examples. The memory request information may include certain information that the memory bandwidth calculating module 100 can use to calculate the memory bandwidth in relation to the memory request.

The memory path creating module 110 creates a memory path for accessing the memory using a memory hierarchical structure. According to at least some example embodiments, the memory path creating module 110 may create the memory path such that a memory region that corresponds to the memory path is a memory path allocated to support the memory bandwidth that is calculated by the memory bandwidth calculating module 100. According to at least some example embodiments, the memory path creating module 110 may allocate (or, alternatively, cause to be allocated) a desired memory region by selectively choosing a particular memory path.

In some embodiments of at least one example embodiment of the inventive concepts, the memory may include a plurality of sub-arrays including memory cells, a plurality of banks each including the plurality of sub-arrays, a plurality of ranks each including the plurality of banks, and a plurality of channels including the plurality of the ranks. Here, the sub-arrays, the banks, the ranks, and the channels form the memory hierarchical structure. For example, the memory may include two channels, each of the channels includes two ranks, each of the ranks includes 6 banks, and each of the banks includes 4 sub-arrays. Here, in the memory hierarchical structure, the channel corresponds to the uppermost level, and the sub-array corresponds to lowermost level.

The memory path that is created by the memory path creating module 110 may include at least one of the plurality of channels, at least one of the plurality of ranks, at least one of the plurality of banks, and at least one of the plurality of sub-arrays. For example, the memory path that is created by the memory path creating module 110 may include one channel and two ranks included in the channel. As another example, the memory path that is created by the memory path creating module 110 may include two channels and the first one of the ranks included in the respective channels. The detailed examples thereof will be described later with reference to FIGS. 3 to 6.

The memory region that corresponds to the created memory path is allocated to support the memory bandwidth that is calculated by the memory bandwidth calculating module 100. On the other hand, while data is written in or read from the memory region that corresponds to the created memory path, that data is not written in or read from the one or more memory regions that do not correspond to the created memory path. For example, according to at least some example embodiments of the inventive concepts, the load unbalancing unit 10 allocates a memory region such that the allocated memory region has at least enough size or, alternatively, only enough size to support the memory bandwidth that is calculated by the memory bandwidth calculating module 100, but does not use the remaining memory region. For example, according to at least some example embodiments of the inventive concepts, the load unbalancing unit 10 may exclude use of one or more unallocated memory regions (i.e., non-use regions) or one or more memory regions that do not correspond to the path created by the memory path creating unit 110 such that only the allocated memory region (i.e., the use region) is used to respond to the memory request. Accordingly, the memory bandwidth can be limited, and unnecessary power consumption can be reduced.

The memory address mapping module 120 maps physical addresses of the memory region that corresponds to the memory path on a virtual address space As described above, since the memory path that is created by the memory path creating module 110 on the basis of the memory bandwidth calculated by the memory bandwidth calculating module 100 is made to use only a partial region of a whole memory, the memory bandwidth can be limited. However, since the semiconductor device according to various embodiments of at least one example embodiment of the inventive concepts uses the memory interleaving technique, it is required to divide the memory region into a use region and a non-use region while maintaining the memory interleaving technique.

According to at least one example embodiment of the inventive concepts, the physical addresses of the memory region that corresponds to the memory path that is created by the memory path creating module 110 among the physical addresses that correspond to the whole region of the memory are mapped on the virtual address space. The mapping may be completed before the memory interleaving is performed. In order to divide the memory region into a use region and a non-use region while maintaining the memory interleaving technique, the memory address mapping module 120 may perform the memory interleaving with respect to the physical address space. The detailed examples thereof will be described later with reference to FIG. 7.

In some embodiments of at least one example embodiment of the inventive concepts, the memory region that corresponds to the memory path that is created by the memory path creating module 110, i.e., the use region, may operate in a normal power mode, and the memory region that does not correspond to the memory path, i.e., the non-use region, may operate in a low power mode. Particularly, in at least some example embodiments of the inventive concepts, the non-use region may operate in a self-refresh mode.

Since the memory bandwidth is flexibly used by the load unbalancing unit 10 according to at least one example embodiment of the inventive concepts in accordance with the detailed memory accessing conditions, unnecessary power consumption that is caused by the operation of the unnecessary bandwidth can be reduced, and thus the memory interleaving technique can be efficiently improved. Particularly, in various embodiments of at least one example embodiment of the inventive concepts, the memory bandwidth can be flexibly used while the memory interleaving technique is maintained.

FIG. 2 is a schematic diagram explaining a semiconductor system according to at east one example embodiment of the inventive concepts.

Referring to FIG. 2, a semiconductor system 1 according to at least one example embodiment of the inventive concepts may include a load unbalancing unit 10, a CPU 12, a GPU 14, a modem 16, and memory controllers 20 and 30 respectively controlling memory modules 22 and 32. The load unbalancing unit 10, the CPU 12, the GPU 14, the modem 16, and the memory controllers 20 and 30 may be electrically connected to one another through buses 16 and 18 to send and receive data. The semiconductor system 1 according to at least one example embodiment of the inventive concepts is not limited to the example structure illustrated in FIG. 2, and may include hardware devices, such as a DSP (Digital Signal Processor) and a CI (Cellular Processor). Like the load unbalancing unit 10, the memory controllers 20 and 30 may be implemented by, for example, hardware, processors executing computer-readable code, or a combination of the above-referenced hardware and processors executing computer-readable code.

The memory modules 22 and 32 include hardware-implemented memory devices. In at least some example embodiments of the inventive concepts, the memory modules 22 and 32 may include a certain volatile memory device including a DRAM, such as a DDR SDRAM (Double Data Rate Static DRAM), a SDR SDRAM (Single Data Rate SDRAM), an LPDDR SDRAM (Low Power DDR SDRAM), an LISDR SDRAM (Low Power SDR SDRAM), or a direct RDRAM (Rambus DRAM), but are not limited thereto. In particular, the memory controllers 20 and 30 and the memory modules 22 and 32 according to various embodiments of at least one example embodiment of the inventive concepts may correspond to multi-channel memories.

Figure 3:
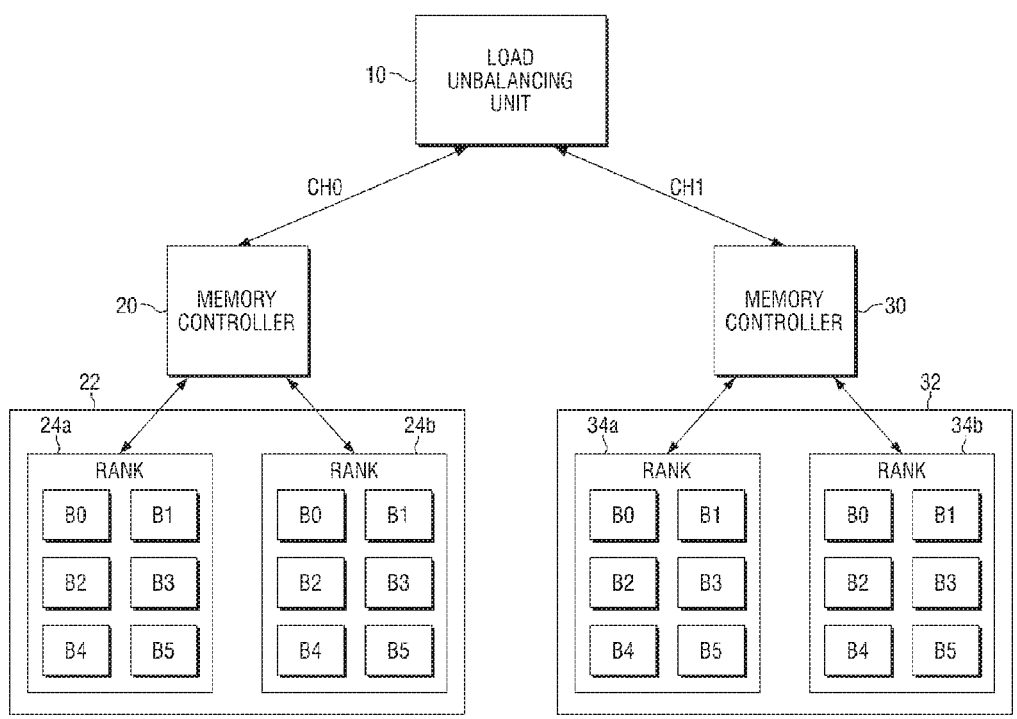
FIG. 3 is a schematic diagram explaining a memory interleaving technique of a semiconductor system according to at least one example embodiment of the inventive concepts.

FIG. 3 is a schematic diagram explaining a memory interleaving technique of a semiconductor system according to at least one example embodiment of the inventive concepts.

Referring to FIG. 3, in the semiconductor system according to at least one example embodiment of the inventive concepts, which includes the load unbalancing unit 10, the memory controllers 20 and 30, and the memory modules 22 and 32, channels CH0 and CH1, ranks 24a, 24b, 34a, and 34b, banks B0 to B5, and sub-arrays included in the respective banks B0 to B5 may form a logical hierarchical structure.

Specifically, the channel CH0 may be formed between the load unbalancing unit 10 and the memory controller 20, and include two ranks 24a and 24b. In the same manner, the channel CH1 may be formed between the load unbalancing unit 10 and the memory controller 30, and include two ranks 34a and 34b. The rank 24a may include 6 banks B0 to B5, and each of the ranks 24b, 34a, and 34b may also include 6 banks (B0 to B5). Each of the banks B0 to B5 may include a plurality of sub-arrays that are composed of memory cells in which data is actually recorded.

For convenience in explanation, FIG. 3 illustrates that each of the two channels CH0 and CH1 includes 4 ranks 24a, 24b, 34a, and 34b, and each of the 4 ranks 24a, 24b, 34a, and 34b includes 6 banks B0 to B5. However, the scope of at least one example embodiment of the inventive concepts is not limited thereto, and the numbers of the channels, ranks, banks, and sub-arrays may be set in manner different than the example shown in FIG. 3.

Figure 4:
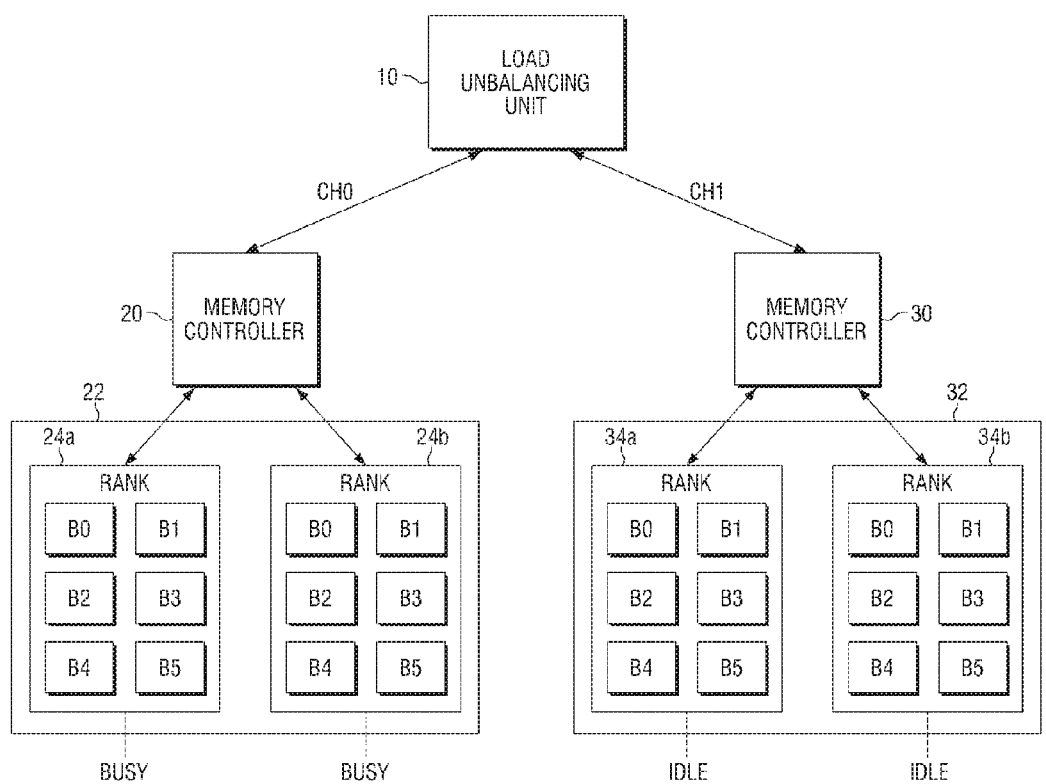
FIG. 4 is a schematic diagram explaining an example of the operation of a semiconductor system according to at least one example embodiment of the inventive concepts.

FIG. 4 is a schematic diagram explaining an example of the operation of a semiconductor system according to at least one example embodiment of the inventive concepts.

Figure 5:
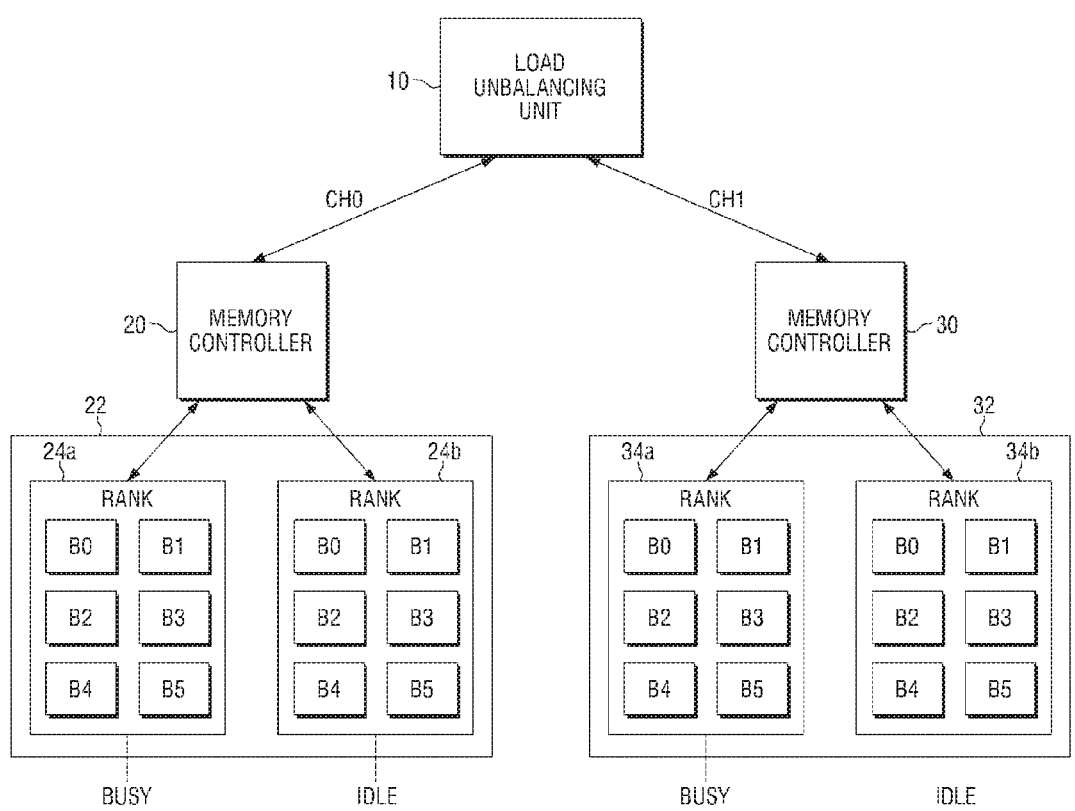
FIG. 5 is a schematic diagram explaining another example of the operation of a semiconductor system according to at least one example embodiment of the inventive concepts.
Figure 6:
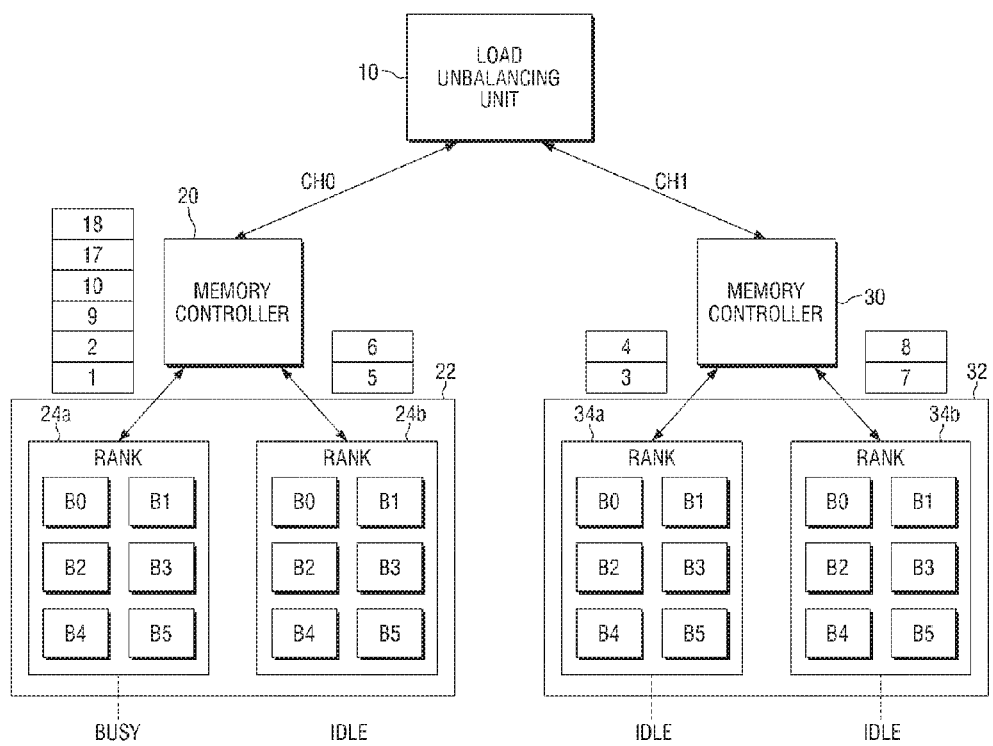
FIG. 6 is a schematic diagram explaining still another example of the operation of a semiconductor system according to at least one example embodiment of the inventive concepts.

According to a general memory interleaving technique, all the channels CH0 and CH1, the ranks 24a, 24b, 34a, and 34b, the banks B0 to B5, and the sub-arrays included in each of the respective banks B0 to B5 as illustrated in FIG. 3 are used. In contrast, as illustrated in FIG. 4, according to at least some example embodiments of the inventive concepts, only one CH0 of the two channels and only the ranks 24a and 24b included in the channel CH0 may be used, and the channel CH1 and the ranks 34a and 34b included in the channel CH1 may not be used. In FIGS. 4-6 the ranks that are used or not used are indicated by the status identifiers "IDLE" (i.e., not used) and "BUSY" (i.e., used).

For example, in the case where memory bandwidth that is calculated by the memory bandwidth calculating module 100 is equal to or lower than 50% of a maximum amount of memory bandwidth that can be secured through the memory interleaving technique, the memory path creating module 110 may create the memory path including the channel CH0, the ranks 24a and 24b, and the banks B0 to B5. For example, the load unbalancing unit 10 may operate the memory region that corresponds to the memory path including the channel CH0, the rank 24a and 24b, and the banks B0 to B5 in a normal power mode, and operate the remaining memory region in a self-refresh mode. Accordingly, the power that is consumed in the memory region that operates in the self-refresh mode becomes a reduced or, alternatively, minimum power.

As can be known from this embodiment, since the memory bandwidth is flexibly used in accordance with the detailed memory accessing conditions, unnecessary power consumption that is caused by the operation of the unnecessary bandwidth can be reduced, and thus the memory interleaving technique can be efficiently improved.

On the other hand, in some embodiments of at least one example embodiment of the inventive concepts, the load unbalancing unit 10 may receive a memory reclaim request for the memory. In this case, the load unbalancing unit 10 may reclaim at least a part of the memory region that corresponds to the memory path, i.e., the already used region. In particular, the load unbalancing unit 10 may preferentially reclaim the at least a partial region of the memory region that corresponds to the memory path rather than other regions. As described above, in the case where a part of the memory region that has already been activated is reclaimed rather than reclaiming a part of the memory region that operates in the self-refresh mode, the self-refresh region may be further secured in the memory, and thus an overall power consumption of semiconductor system 1 can be reduced or, alternatively, minimized.

FIG. 5 is a schematic diagram explaining another example of the operation of a semiconductor system according to at least one example embodiment of the inventive concepts.

Referring to FIG. 5, although two channels CH0 and CH1 are all used, only one 24a of two ranks 24a and 24b is used in the channel CH0, and only one 34a of two ranks 34a and 34b is used in the channel CH1. Further, the ranks 24b and 34b are not in use.

In some embodiments of at least one example embodiment of the inventive concepts, the memory bandwidth calculating module 100 may calculate the memory bandwidth on the basis of memory latency information that is a kind of memory request information as described above in relation to FIG. 1. For example, the memory latency information may include rank-to-rank switch latency information or FAW (Four-bank Activation Window) information.

For example, FIG. 5 illustrates a scenario to use only one rank in two channels so as to prevent the rank-to-rank switch latency. In this case, the memory path creating module 110 may create the memory path that includes the channel CH0, the rank 24a, and the banks B0 to B5 and the memory path that includes the channel CH1, the rank 34a, and the banks B0 to B5. That is, the load unbalancing unit 10 may operate the memory region that corresponds to the memory path including the channel CH0, the rank 24a, and the banks B0 to B5 and the memory path including the channel CH1, the rank 34a, and the banks B0 to B5 in a normal power mode, and operate the remaining memory region in a self-refresh mode. Accordingly, the power that is consumed in the memory region that operates in the self-refresh mode becomes a reduced or, alternatively, minimum power.

As can be known from this embodiment, since the memory bandwidth is flexibly used in accordance with the detailed memory accessing conditions, unnecessary power consumption that is caused by the operation of the unnecessary bandwidth can be reduced, and thus the memory interleaving technique can be efficiently improved.

Figure 7:
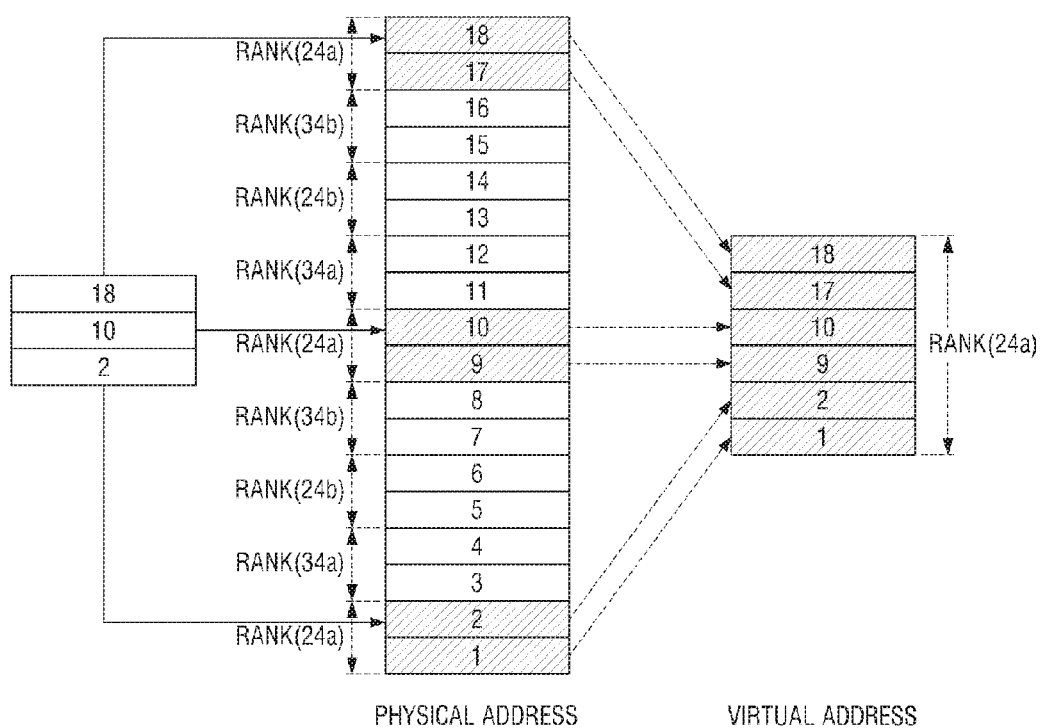
FIG. 7 is a schematic diagram explaining an address mapping according to the operation of the semiconductor system of FIG. 6.

FIG. 6 is a schematic diagram explaining still another example of the operation of a semiconductor system according to at least one example embodiment of the inventive concepts, and FIG. 7 is a schematic diagram explaining an address mapping according to the operation of the semiconductor system of FIG. 6.

Referring to FIGS. 6 and 7, only one CH0 of the two channels and only the rank 24a included in the channel CH0 are used, and the rank 24b of the channel CH0, the channel CH1, and the ranks 34a and 34b included in the channel CH1 are not in use. Here, physical addresses that correspond to the rank 24a are "1", "2", "9", "10", "17", and "18", and physical addresses that correspond to the rank 24b are "5", "6", "13", and "14". Further, physical addresses that correspond to the rank 34a are "3", "4", "11", and "12", and physical addresses that correspond to the rank 34b are "7", "8", "15", and "16".

In this case, a virtual address space is formed to flexibly use the memory bandwidth while maintaining the memory interleaving technique. The virtual address space includes the addresses that are mapped on the physical addresses corresponding to the use region among the plurality of physical addresses. For example, the virtual address space in FIG. 7 includes only the addresses that correspond to the physical addresses "1", "2", "9", "10", "17", and "18".

If the memory interleaving is performed with respect to the physical address space that is mapped on the virtual address space that is formed as described above, only the rank 24a included in the channel CH0 is used, and the rank 24b of the channel CH0, the channel CH1, and the ranks 34a and 34b included in the channel CH1 are not in use. For example, in the case of write data in addresses "2", "10", and "18" of the virtual address region, "2", "10", and "18" correspond to the rank 24a included in the channel CH0, and thus the data is written using only the rank 24a included in the channel CH0.

Figure 8:
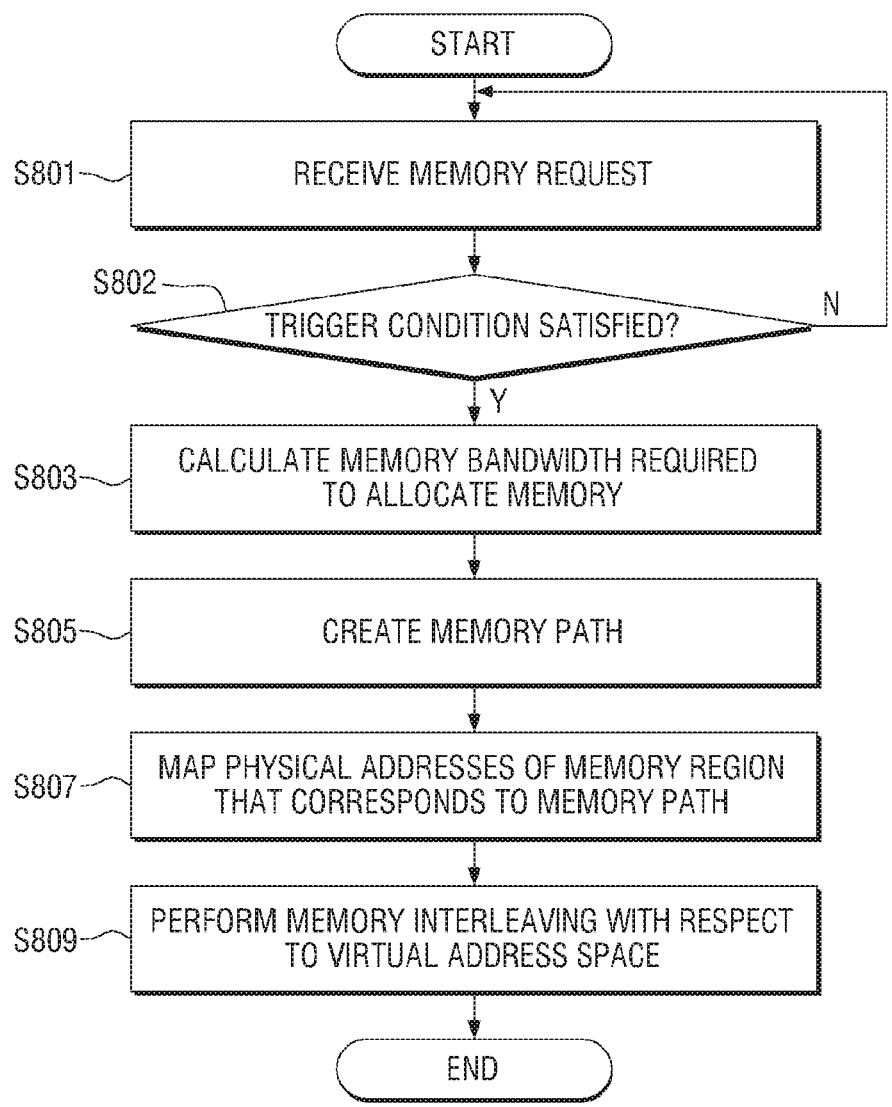
FIG. 8 is a flowchart explaining a method for operating a semiconductor device according to at least one example embodiment of the inventive concepts.

FIG. 8 is a flowchart explaining a method for operating a semiconductor device according to at least one example embodiment of the inventive concepts.

Referring to FIG. 8, a method for operating a semiconductor device according to at least one example embodiment of the inventive concepts includes receiving a memory request for a memory (S801), calculating a memory bandwidth that is required to allocate the memory in accordance with the memory request (S803), and creating a memory path for accessing the memory using a memory hierarchical structure of the memory (S805). Further, the method includes mapping physical addresses of a memory region that corresponds to the memory path on virtual addresses (S807), and performing memory interleaving with respect to the virtual address region (S809).

In some embodiments of at least one example embodiment of the inventive concepts, the receiving the memory request for the memory (S801) may include determining whether at least one trigger condition for calculating the memory bandwidth is satisfied (S802). Here, as described above with reference to FIG. 1, the trigger condition may include, for example, a case where there is a function call for a memory allocator, a case where any application is executed, a case where a specific application is executed, a case where a thread or a process is created or executed, and a case where a memory fault occurs.

Figure 9:
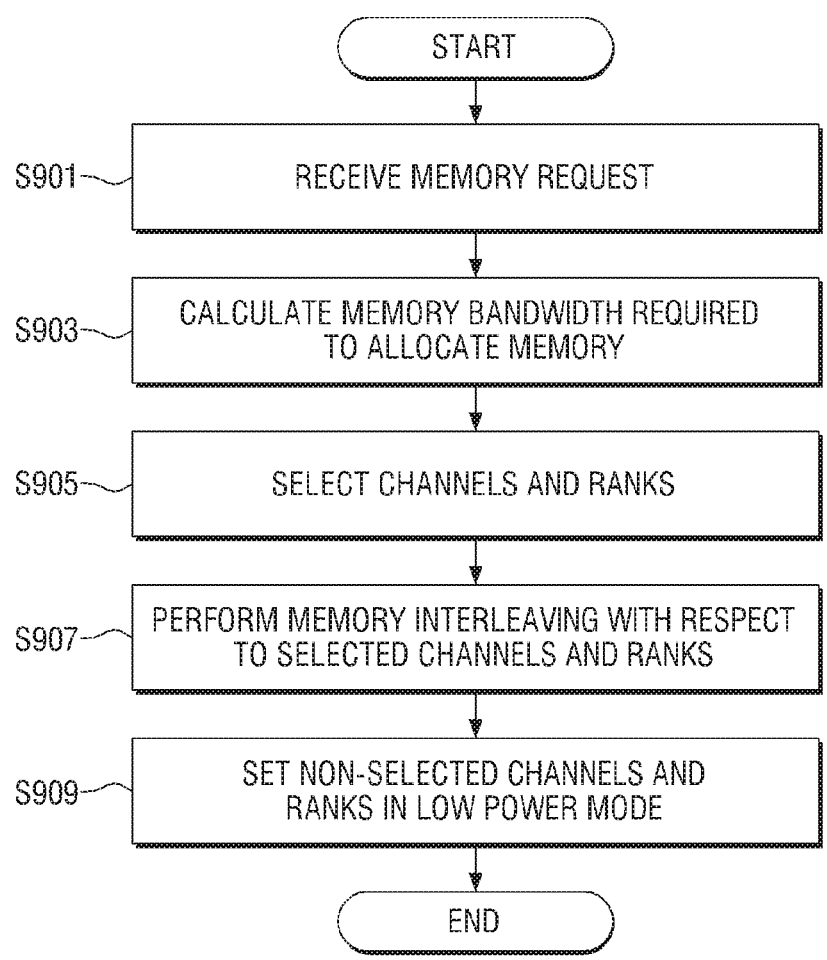
FIG. 9 is a flowchart explaining a method for operating a semiconductor device according to at least another example embodiment of the inventive concepts.

FIG. 9 is a flowchart explaining a method for operating a semiconductor device according to at least another example embodiment of the inventive concepts.

Referring to FIG. 9, a method for operating a semiconductor device according to at least another example embodiment of the inventive concepts includes receiving a memory request for a memory (S901), calculating a memory bandwidth that is required to allocate the memory in accordance with the memory request (S903), and selecting ranks and channels that support the memory bandwidth among a plurality of ranks of the memory and a plurality of channels including the plurality of ranks (S905). Further, the method includes performing memory interleaving with respect to the selected ranks and channels (S907), and setting the non-selected channels and ranks in a low power mode (S909).

Figure 10:
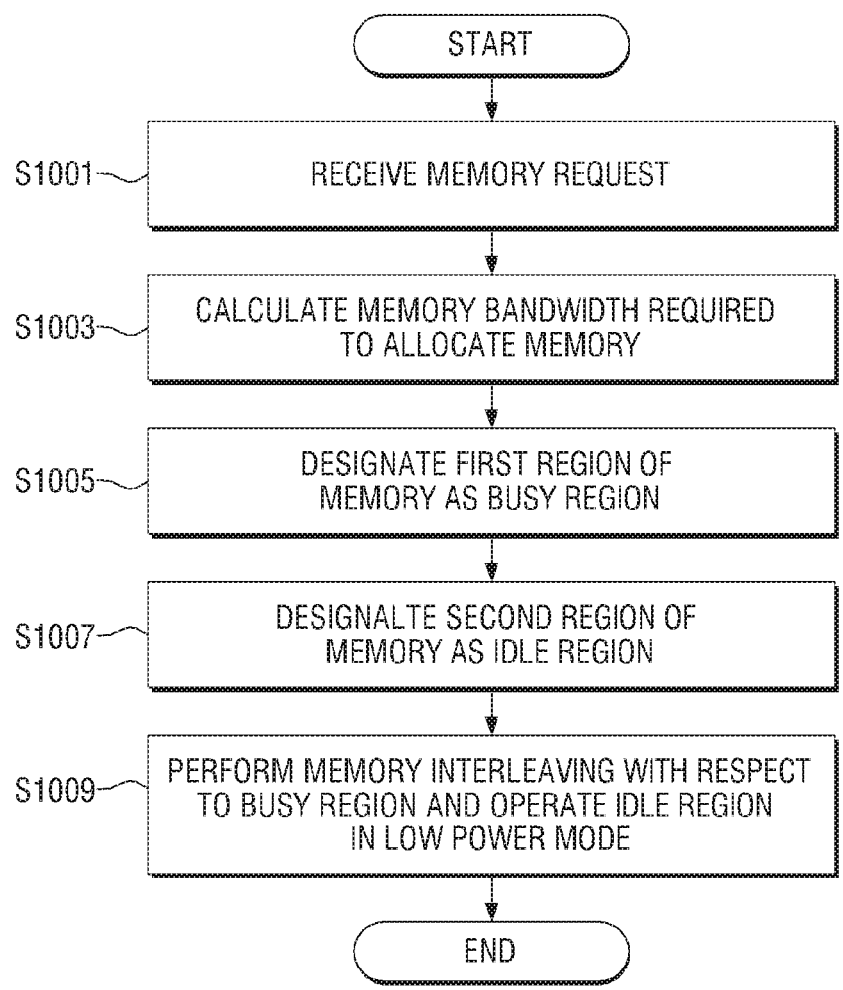
FIG. 10 is a flowchart explaining a method for operating a semiconductor device according to at least another example embodiment of the inventive concepts.

FIG. 10 is a flowchart explaining a method for operating a semiconductor device according to at least another example embodiment of the inventive concepts.

Referring to FIG. 10, a method for operating a semiconductor device according to at least another example embodiment of the inventive concepts includes receiving a memory request for a memory (S1001), and calculating a memory bandwidth that is required to allocate the memory in accordance with the memory request (S1003). Further, the method includes designating a first region of the memory as a busy region (S1005), the busy region including at least enough memory resources to support the memory bandwidth or, alternatively, a minimum amount of memory resources necessary to support the memory bandwidth, designating a second region of the memory as an idle region (S1007), and performing memory interleaving with respect to the busy region (S1009).

Here, the busy region corresponds to a use region of the memory which data is written in or read from, and the idle region corresponds to a non-use region of the memory. Further, the memory resources may include sub-arrays, banks including the sub-arrays, ranks including the banks, and channels including the ranks.

Figure 11:
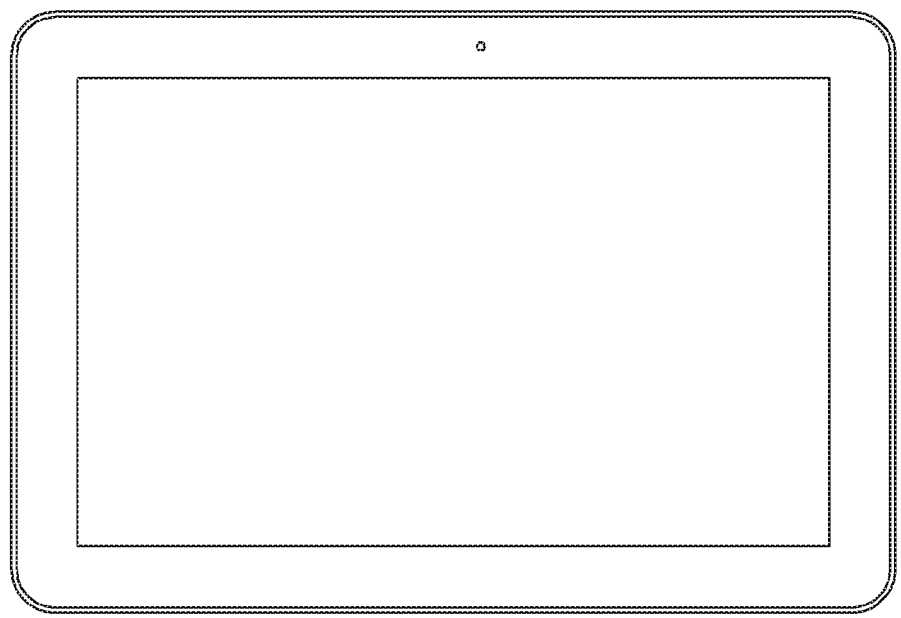
FIGS. 11 to 13 are views of example semiconductor systems to which a semiconductor device according to embodiments of at least one example embodiment of the inventive concepts can be applied.
Figure 12:
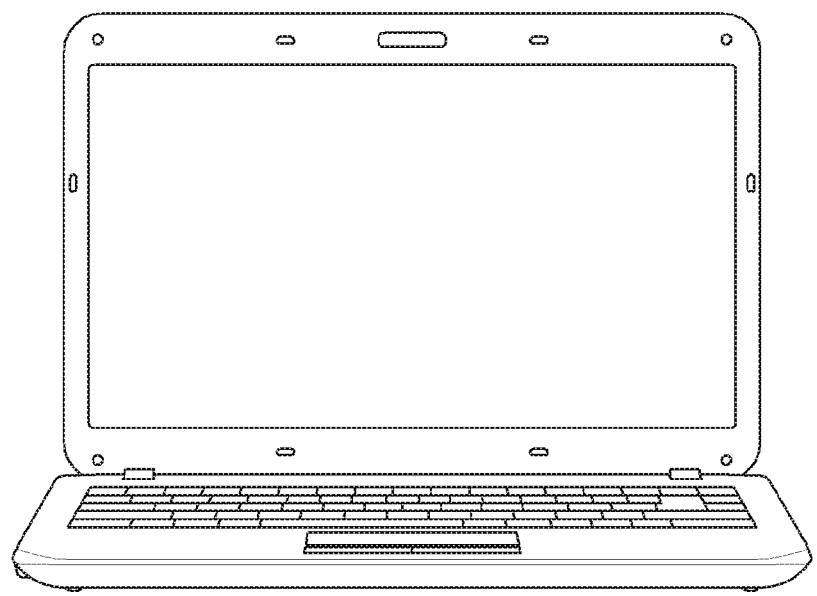
Figure 13:
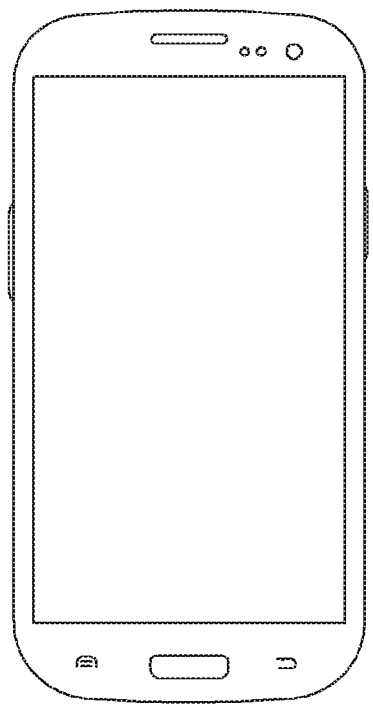

FIGS. 11 to 13 are views of example semiconductor systems to which a semiconductor device according to embodiments of at least one example embodiment of the inventive concepts can be applied.

FIG. 11 illustrates a tablet PC 1200, FIG. 12 illustrates a notebook computer 1300, and FIG. 13 illustrates a smart phone 1400. The semiconductor system according to embodiments of at least one example embodiment of the inventive concepts may be used in the tablet PC 1200, the notebook computer 1300, and the smart phone 1400 as described above.

Further, it is apparent to those of ordinary skill in the art that the semiconductor system according to some embodiments of at least one example embodiment of the inventive concepts can also be adopted in other various electronic devices. The tablet PC 1200, the notebook computer 1300, and the smart phone 1400 are discussed with reference to the semiconductor system according to this embodiment, but the scope of at least one example embodiment of the inventive concepts is not limited thereto. In some embodiments of at least one example embodiment of the inventive concepts, the semiconductor system may be implemented by a computer, a UMPC (Ultra Mobile PC), a work station, a net-book, a FDA (Personal Digital Assistants), a portable computer, a web tablet, a wireless phone, a mobile phone, a smart phone, an e-book, a PMP (Portable Multimedia Player), a portable game machine, a navigation device, a black box, a digital camera, a 3-dimensional television receiver, a digital audio recorder, a digital audio player, a digital picture recorder, a digital picture player, a digital video recorder, or a digital video player.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A method for operating a volatile semiconductor memory device comprising:
   receiving a memory request for memory of the volatile semiconductor memory device;
   calculating a memory bandwidth such that the memory bandwidth is at least large enough to support allocation of the memory in accordance with the memory request;
   creating a memory path for accessing the memory using a memory hierarchical structure, wherein the creating the memory path comprises selecting one of a plurality of channels of the memory and selecting at least one of a plurality of ranks of the selected one of the plurality of channels, wherein a memory region of the memory that corresponds to the memory path is a memory region that is allocated to support the memory bandwidth and the memory region comprises the selected one of the plurality of channels and the selected at least one of the plurality of ranks; and
   performing memory interleaving with respect to the memory region that corresponds to the memory path, wherein the performing the memory interleaving includes,
      operating the memory region of the memory that corresponds to the memory path in a normal power mode; and
      operating a memory region of the memory that does not correspond to the memory path in a low power mode, the low power mode being a self-refresh mode that uses less power than the normal power mode.

2. The method of claim 1, wherein the calculating the memory bandwidth comprises:
   calculating the memory bandwidth using at least one of parameter information used for the memory request, bandwidth information of another device that has made the memory request, bandwidth information determined in accordance with an operation scenario of the semiconductor memory device, and bandwidth information determined in a process or a thread to make the memory request.

3. The method of claim 2, wherein the calculating the memory bandwidth includes recalculating the memory bandwidth in a case where the operation scenario of the semiconductor memory device is changed.

4. The method of claim 1, wherein the memory includes a plurality of sub-arrays including memory cells, a plurality of banks each including the plurality of sub-arrays, a plurality of ranks each including the plurality of banks, and a plurality of channels including the plurality of ranks, and
the sub-arrays, the banks, the ranks, and the channels form the memory hierarchical structure.

5. The method of claim 4, wherein the memory path for accessing the memory includes at least one of the plurality of channels, at least one of the plurality of ranks, at least one of the plurality of banks, and at least one of the plurality of sub-arrays.

6. The method of claim 1, wherein physical addresses of the memory region that corresponds to the memory path are mapped on a virtual address space, and
the performing the memory interleaving includes performing the memory interleaving with respect to the physical addresses.

7. The method of claim 1, wherein the performing the memory interleaving comprises:
operating the memory region that corresponds to the memory path in a normal power mode; and
operating a memory region of the memory that does not correspond to the memory path in a self-refresh mode.

8. A method for operating a volatile semiconductor memory device comprising:
receiving a memory request for memory of the volatile semiconductor memory device;
calculating a memory bandwidth such that the memory bandwidth is at least large enough to support allocation of the memory in accordance with the memory request;
selecting one of a plurality of ranks of the memory and at least one of a plurality of channels that support the memory bandwidth and the plurality of channels including the plurality of ranks; and
performing memory interleaving with respect to the selected the one of the plurality of ranks and the at least one of the plurality of channels,
operating a memory region that corresponds to non-selected ranks and channels among the plurality of ranks and the plurality of channels of the memory in a low power mode, the low power mode being a self-refresh mode that uses less power than a power mode in which a memory region that corresponds to the selected ranks and channels among the plurality of ranks and the plurality of channels is operated.

9. The method of claim 8, wherein the selecting the ranks and channels that support the memory bandwidth comprises:
selecting the ranks and channels that support the memory bandwidth based on latency information of the memory.

10. The method of claim 9, wherein the latency information of the memory comprises rank-to-rank switch latency information or Four-bank Activation Window (FAW) information.

11. The method of claim 8, further comprising:
mapping physical addresses of the memory region that corresponds to the selected ranks and channels on a virtual address space, and
wherein the performing the memory interleaving with respect to the selected ranks and channels includes performing the memory interleaving with respect to a physical address space.

12. The method of claim 8, wherein the performing the memory interleaving includes operating a memory region of the memory that corresponds to non-selected ranks and channels among the plurality of ranks and the plurality of channels of the memory in a self-refresh mode.

13. The method of claim 8, wherein the selecting the ranks and channels comprises:
selecting sub-arrays, banks, ranks, and channels that support the memory bandwidth among a plurality of sub-arrays, a plurality of banks each including the plurality of sub-arrays, a plurality of ranks each including the plurality of banks, and a plurality of channels including the plurality of ranks.

14. The method of claim 13, wherein the performing the memory interleaving includes operating a memory region of the memory that corresponds to non-selected sub-arrays, banks, ranks, and channels among the plurality of sub-arrays, the plurality of banks, the plurality of ranks, and the plurality of channels.

15. A method of operating a semiconductor memory device including a plurality of memory groups, the method comprising:
receiving a memory request for accessing memory of the semiconductor memory device;
determining, based on the memory request, a first data rate;
allocating a first portion of the plurality of memory groups such that,
the first portion includes one or more memory groups from among the plurality of memory groups and excludes one or more memory groups from among the plurality of memory groups, and
a number of groups in the first portion of the plurality of memory groups is based on the first data rate; and
mapping physical addresses corresponding to the first portion of the plurality of memory groups to virtual address space; and
executing the memory request by performing memory interleaving on the first portion of the plurality of memory groups with respect to the physical addresses mapped to the virtual address space and not on a second portion of the plurality of memory groups, the second portion being the one or more memory groups excluded from the first portion,
the executing including operating the first portion of the plurality of memory groups in a first power mode and operating the second portion of the plurality of memory groups in a second power mode, the second power mode being a self-refresh mode that uses less power than the first power mode.

16. The method of claim 15, wherein,
the memory of the semiconductor memory device includes a plurality of memory modules,
the plurality of memory modules each include a plurality of memory banks, and
the plurality of memory groups is the plurality of memory modules.

17. The method of claim 15, wherein,
the memory of the semiconductor memory device includes a plurality of memory banks, and
the plurality of memory groups is the plurality of memory banks.

18. The method of claim 15, wherein,
the memory of the semiconductor memory device includes a plurality of memory ranks,
the plurality of memory ranks each include a plurality of memory banks, and
the plurality of memory groups is the plurality of memory ranks.

* * * * *